United States Patent [19]

Maekawa et al.

[11] Patent Number: 4,637,947
[45] Date of Patent: Jan. 20, 1987

[54] HEAT INSULATION MATERIAL

[75] Inventors: Taijiro Maekawa; Yukio Fujino, both of Tokyo, Japan

[73] Assignee: Anmin Manufacturing Co., Ltd., Tokyo, Japan

[21] Appl. No.: 640,642

[22] Filed: Aug. 14, 1984

[51] Int. Cl.⁴ .................. A41D 13/00; A41D 27/02; A47G 9/00; B32B 15/14

[52] U.S. Cl. ......................... 428/68; 2/243 R; 2/272; 5/459; 5/483; 250/515.1; 250/519.1; 297/DIG. 5; 428/103; 428/138; 428/198; 428/285; 428/287; 428/298; 428/300; 428/302; 428/920

[58] Field of Search ............ 428/285, 298, 103, 198, 428/287, 300, 302, 920, 68, 138, 235; 112/420, 440; 220/901; 250/515.1, 519.1; 297/DIG. 5; 5/459, 483; 2/272, 243 R

[56] References Cited

U.S. PATENT DOCUMENTS

| | | | |
|---|---|---|---|
| 2,561,891 | 7/1951 | Tucker | 112/446 |
| 2,714,563 | 8/1955 | Poorman et al. | 427/12 |
| 3,660,138 | 5/1972 | Gorrell | 204/192 C |
| 3,934,285 | 1/1976 | May | 297/DIG. 5 |
| 4,232,620 | 11/1980 | Kurz | 428/920 |
| 4,357,387 | 11/1982 | George et al. | 427/34 |
| 4,395,455 | 7/1983 | Frankosky | 2/272 |
| 4,401,707 | 8/1983 | Bailey et al. | 428/285 |
| 4,460,645 | 7/1984 | Jones et al. | 112/420 |
| 4,463,465 | 8/1984 | Parker et al. | 428/920 |
| 4,500,592 | 2/1985 | Lee et al. | 428/920 |
| 4,508,776 | 4/1985 | Smith | 428/285 |
| 4,535,017 | 8/1985 | Kuckein et al. | 428/285 |
| 4,540,617 | 9/1985 | Kawanishi et al. | 428/920 |

FOREIGN PATENT DOCUMENTS 1583774 2/1981 United Kingdom .

Primary Examiner—James C. Cannon
Attorney, Agent, or Firm—Armstrong, Nikaido, Marmelstein & Kubovcik

[57] ABSTRACT

A heat insulation material which is used as wadding for winter clothes, bedclothes, cushions, etc. A fibrous sheet material such as non-woven fabrics, knitted fabrics and textile is used to support or carry a metal and the fibrous sheet material having a metal deposited surface is fixed to a heat insulating fibrous layer.

11 Claims, 3 Drawing Figures

HEAT INSULATION MATERIAL

BACKGROUND OF THE INVENTION

This invention relates to a heat insulation material which is used as wadding for winter clothes, bedclothes, cushions etc. and resilient wadding for curtains and interior decoration etc.

It is well known to provide such wadding as used in bedclothes and winter clothes in which a metal film is deposited or transferred to either one surface or both surfaces of a sheet composed of synthetic resin film and a web is laminated over said sheet in order to improve heat insulation characteristic. However, this type of wadding had disadvantage that a satisfactory feeling of wearing it could not be attained due to the fact that when the sheet of film was applied as wadding, it had no permeability and expansion and contraction characteristics. Arrangement of a metal deposited surface over the entire surface of the sheet caused the sheet to be lack of permeability and be musty.

Further, although the sheet having these metal deposited surfaces had such effect as capable of generating aesthetic appearance due to its luster when the sheet was applied with its metal deposited surface being faced outside, a slimy touch caused by adhesion of moisture produced from a skin to the metal deposited surfaces was generated when the metal deposited surfaces were contacted with the skin of the user, resulting in making bad feeling touch. Further, due to a high thermal conductivity of metal, in case that the metal deposited surfaces were contacted with the body of the user, the heat in the body was removed through the metal. Some persons complained about a glittering luster surface.

SUMMARY OF THE INVENTION

It is an object of the present invention to provide a heat insulation material which is thin and light and has both a heat insulation and an insulating characteristic as well as expansion and contraction characteristics and further has a permeability.

It is another object of the present invention to prevent body heat from being transferred to metal due to an occurance of slimy feeling under adhesion of moisture generated from the body by direct contact of the skin of the user to the metal deposited surface and in particular direct contact of the body with metal deposited surfaces when they are used in cushions and mats etc. and further to provide effect of insulation and heat insulation caused by the metal deposited surfaces.

According to the present invention, fibrous sheet material such as non-woven fabrics, knitted fabrics and textiles is used to support or carry the metal and the fibrous sheet material having a metal deposited surface is fixed to a heat insulating fibrous layer.

Further, a porous cover may be arranged on the metal deposited surface of the fibrous sheet material.

DETAILED DESCRIPTION OF THE INVENTION

Figure 1:
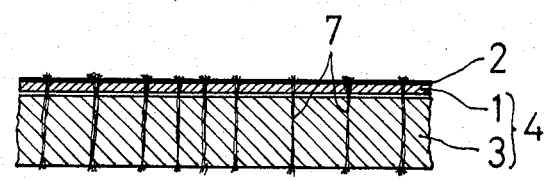
FIG. 1 is a sectional view for illustrating a heat insulation material of a first embodiment of the present invention.

This invention relates to a heat insulation material in which a reflecting layer composed of metal or non-metal material is integrally positioned at the outer surface of a supporting material composed of fibrous sheet materials and thereby a heat insulated fibrous layer is fixed.

The supporting material of heat insulation material of the present invention is composed of fibrous sheet materials such as non-woven fabrics, woven fabrics and knitted textiles etc. wherein it can be classified into two cases, one case in which they are made to a fabric form together and a reflecting layer of metal or non-metal material is deposited in vacuum condition or transferred onto the surface of the supporting material and the other case in which a reflecting layer is deposited on yarn surfaces while the fabric or knitted textile is kept in its yarn condition and then finished yarns are knitted or woven to make the reflecting layer of the surface of the supporting material.

In order to make a cover under vacuum deposition process which is one of means for forming a reflecting layer, it is possible to apply metal or non-metal such as aluminum, gold, silver, nickel, chromium, fluomagnesium and silicon monoxide etc. However, although aluminum is superior in its economical use and heat resistance, both gold and silver have high thermal reflection rate of long wave length.

In order to form the above-mentioned reflecting layer on the fibrous sheet material, at first a moisture ratio of the fibrous sheet material is reduced to 1.5% or less under predrying operation in a vacuum depositing machine having the fibrous sheet material therein and at the same time the inner part of the machine is reduced in its pressure by a vacuum pump, reflecting film layer forming substance such as aluminum etc. is melted and vapourized by an electric crucible in the vacuum depositing machine and then deposited on the entire surface of the fibrous sheet material. The reflecting layer forming substance in the above-mentioned system is only deposited to the surface of fibrous sheet material oppositely faced to the electric crucible, that is, the surface of a system composing fibrous sheet material.

As a second forming method for a reflecting layer, there is a transfer process. That is, there is arranged a deposited sheet in which any substance that is the same as the reflecting layer forming substance such as aluminum etc. applied in the above-mentioned vacuum depositing means is vacuum deposited on film surfaces such as polyethylene, polyester and the like, wherein original adhesive agent is applied with a coating machine to the fibrous sheet material forming the reflecting layer, the cover surface of the depesited sheet is laid on it and pressed, the film is peeled off and only the reflecting surface is transferred to yarns composing the fibrous sheet material.

In case that vacuum deposition is made to the yarns before their knitting or weaving, deposition substance is deposited only to the surface against the crucible in which depositing substance for the yarns is melted, so that it is necessary to guide the yarns in such a way as entire circumferences of the yarns are oppositely faced against the crucible in order to deposit depositing substance to the entire surface of the yarns.

The fibrous sheet material having such a reflecting layer as made in the manner described above is formed such that even in case of vacuum deposition or in case of transfer, the reflecting layer is formed only on one surface of the yarns constituting the fibrous sheet material and no reflecting layer is present at other portions. Therefore, if the material is of knitted fabric, the knitted mesh parts are left as spacings, resulting in forming noncontinuous porous film surfaces as the reflecting layer and having full of permeability. Therefore, an arrangement of knitted fabric with only reflecting layer being formed is effective for preventing a radiation, and hardly prevents heat radiation caused by convection, radiation and thermal conduction. Therefore, heat insulation fibrous layer composed of synthetic fiber and natural fiber etc. is integrally fixed to the fibrous sheet material.

The heat insulation fibrous layer is made such that short fiber of synthetic fiber such as polyester, acryle and nylon etc. and natural fiber such as silk wrap and wool etc. is carded, cross laid and made to form a layer having a specified unit weight.

As the synthetic fiber composing the above-mentioned heat insulation layer, hollow fiber of polyester has a superior resiliency and heat insulation characteristic. Porous fiber is preferable due to its light weight. Fine fibers with a Denier of 0.1 to 8 form static air layers, so that they are effective for preventing thermal convection.

The above-mentioned fibrous sheet material and the heat insulation fibrous layer are laminated, stiched with a needle punching machine or adhered at dotted points with adhesive agent to make an integral heat insulation material. In order to make a superior surface touch of the heat insulation material, porous cover fabrics are sometimes arranged at the surface of the material.

In FIG. 1, a reference numeral 1 designates a supporting material which is composed of fibrous sheet material such as non-woven fabrics, woven farbics and knitted fabrics and the like and which has a reflecting layer 2 at its surface under coating, vapour deposition, transfer and other processes. Reference numeral 3 designates a heat insulating fibrous layer which is composed of a carding web, feathering, and tow laminated layer and the like. In case that the supporting material 1 and the heat insulating fibrous layer 3 are laminated, they are laminated in such a way the reflecting layer 2 of the supporting material 1 is positioned outside. The heat insulation material 4 is composed of the supporting material 1 and the heat insulating fibrous layer 3. As means for making an integral assembling of the supporting material 1 and the heat insulating fibrous layer 3, there is one method of using needle punching machine and another other method of using adhesive agent. In case of making an integral assembling of the layers with a needle punching machine, the needle punching operation can be performed at either the reflecting layer 2 or the heat insulating fibrous layer 3. In case of performing an integral assembling of layers with a needle punching machine, several fine holes are made in the reflecting layer 2 of the supporting material 1 under needling operation to enable substantial permeability of layers to be attained.

However, if such a means as described above is not applied, needling is performed only at the supporting material 1 to form several fine holes in the supporting material and preferably to keep permeability in the supporting material. Fine holes have a diameter of about 0.1 mm and are made in a density of 20 to 40/cm$^2$. In case of performing the above-mentioned needle punching operation, a part 7 of the fiber forming the heat insulating fibrous layer 3 appears on the reflecting layer 2 at the needle punched portion so as to fix the supporting material 1 and the heat insulating fibrous layer 3 together.

Figure 2:
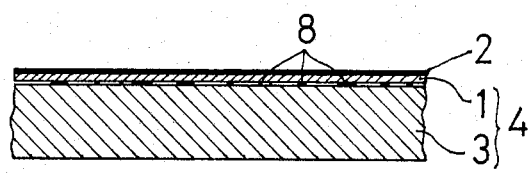
FIG. 2 is a sectional view for illustrating the heat insulation material of a second embodiment.

Example shown in FIG. 2 is one in which the supporting material having a reflecting layer 2 and a heat insulating fibrous layer 3 are adhered to each other with adhesive agent 8 to make an integral assembly thereof and the adhesive agent 8 is arranged in a dotted arrangement between the supporting material and the fibrous layer.

Figure 3:
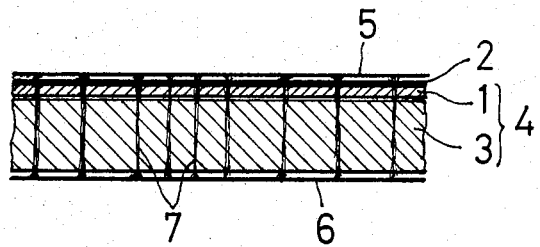
FIG. 3 is a sectional view for illustrating the heat insulation material of the present invention having a cover material.

Example shown in FIG. 3 is one in which both sides of the heat insulating material shown in FIG. 1 are covered with cover materials 5 and 6. The cover material 5 covering the reflecting layer 2 is composed of knitted fabric such as tricot fabric having several fine through-pass holes in it and other fabrics to cause the reflecting layer 2 to be permeable from outside.

What is claimed is:

1. A permeable heat insulating material comprising a supporting material composed of fibrous material, a reflecting layer made of metal or non-metal formed on a surface of the supporting material, and a heat insulating fibrous layer laminated on another surface of of the supporting material; the heat insulating material being laminated so that the reflecting layer is placed outwardly, the supporting material is integrally fixed to the heat insulating layer, and the reflecting layer is formed on the surfaces of fibers or yarns of the fibrous sheet material composing the supporting material prior to lamination of the heat insulating layer thereto.

2. A permeable heat insulation material as set forth in claim 1, wherein the fibrous material is of a woven fabric.

3. A permeable heat insulating material as set forth in claim 1, wherein the fibrous material is of a knitted fabric.

4. A permeable heat insulation material as set forth in claim 1, wherein the fibrous sheet material is of a non-woven fabric.

5. A permeable heat insulating material as set forth in claim 1, wherein a cover material which covers over the reflecting layer is further included.

6. A permeable heat insulating material as set forth in claim 5, wherein the cover material is of a woven fabric.

7. A permeable heat insulating material as set forth in claim 5, wherein the cover material is of a knitted fabric.

8. A permeable heat insulating material as set forth in any of claims 5, 6 or 7, wherein the cover material is of a material having several fine through-pass holes in it.

9. A permeable heat insulating material as set forth in claim 1, wherein the reflecting layer is vacuum deposited onto the surface of the supporting material.

10. A permeable heat insulating material as set forth in claim 1, wherein the reflecting layer is formed on the surface of the supporting material by the steps of forming a deposited sheet comprising vacuum depositing a substance of the reflecting layer on a film, applying an adhesive to the supporting material, placing the vacuum deposited side of the deposited sheet on the supporting material, pressing, and peeling the film off, so that the reflecting layer is transferred onto the surface of the supporting material.

11. A permeable heating insulating film as set forth in claim 1, wherein a substance of the reflecting layer is vacuum deposited onto the surface of yarns which are then knitted or woven to form the reflecting layer.

* * * * *